(No Model.) 4 Sheets—Sheet 1.
W. E. CHALFANT.
FRICTIONAL AND POSITIVE CLUTCH.

No. 522,587. Patented July 10, 1894.

Witnesses:
William A. Baw
R. Schleicher

Inventor:
William E. Chalfant
by his Attorneys
Howson & Howson

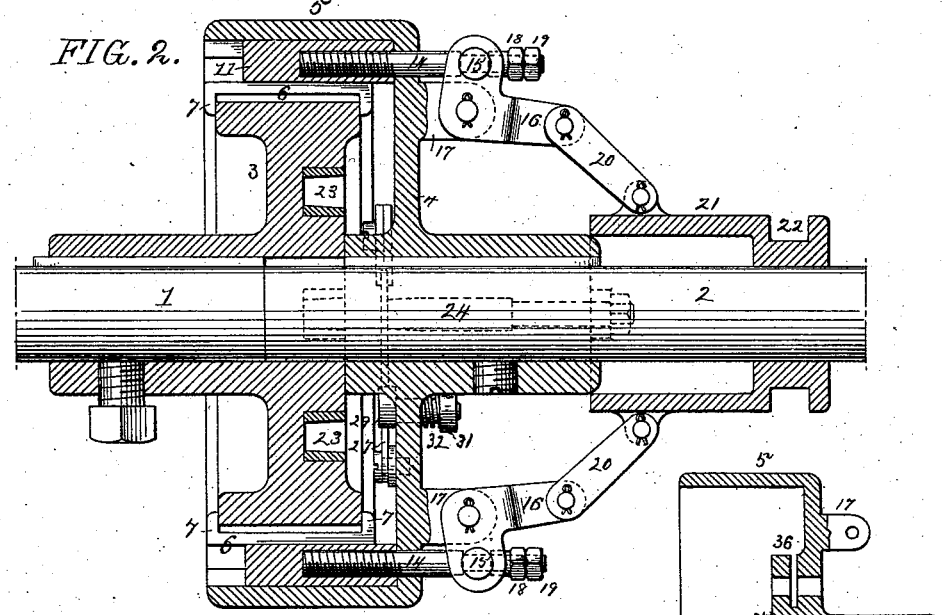

(No Model.) 4 Sheets—Sheet 3.

W. E. CHALFANT.
FRICTIONAL AND POSITIVE CLUTCH.

No. 522,587. Patented July 10, 1894.

Witnesses:
William A. Barr
R. Schleicher.

Inventor
William E. Chalfant
by his Attorneys
Howson & Howson (No Model.) 4 Sheets—Sheet 4.

W. E. CHALFANT.
FRICTIONAL AND POSITIVE CLUTCH.

No. 522,587. Patented July 10, 1894.

Witnesses:
William H. Barr
R. Schleicher

Inventor
William E. Chalfant
by his Attorneys
Howson & Howson

UNITED STATES PATENT OFFICE.

WILLIAM E. CHALFANT, OF PHILADELPHIA, PENNSYLVANIA.

FRICTIONAL AND POSITIVE CLUTCH.

SPECIFICATION forming part of Letters Patent No. 522,587, dated July 10, 1894.

Application filed July 24, 1893. Serial No. 481,324. (No model.)

*To all whom it may concern:*

Be it known that I, WILLIAM E. CHALFANT, a citizen of the United States, residing in Philadelphia, Pennsylvania, have invented certain Improvements in a Combined Positive and Friction Clutch, of which the following is a specification.

The object of my invention is to so construct a combined positive and friction clutch or coupling as to prevent the application of the positive clutch until the friction clutch has been in action a sufficient time to bring the two shafts, or the shaft and pulley, up to the same speed, so that the positive clutching can be effected without any shock or jar of any of the parts, a further object being to provide for the release of the friction clutching device at or before the throwing of the positive clutch into engagement.

Another object is to simplify the construction of the friction clutching devices and to so mount the same as to prevent rattling, wear or heating of the parts when the clutch is loosened, and to readily compensate for the wear due to use, and a final object is to so construct the device as to render the same as compact as an ordinary single friction or positive clutch.

These objects I attain in the manner hereinafter set forth, reference being had to the accompanying drawings, in which—

Figure 1:
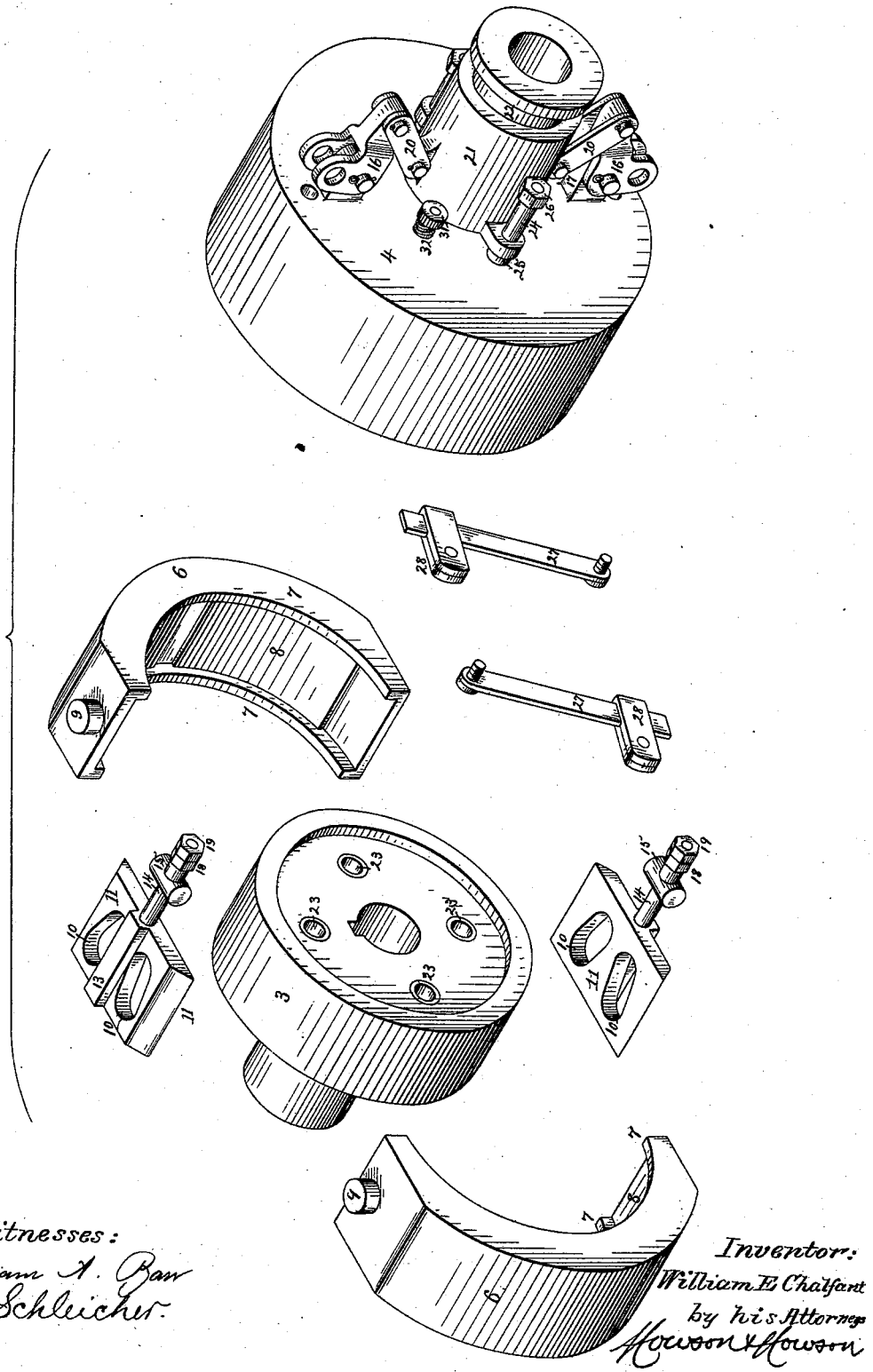
Figure 4:
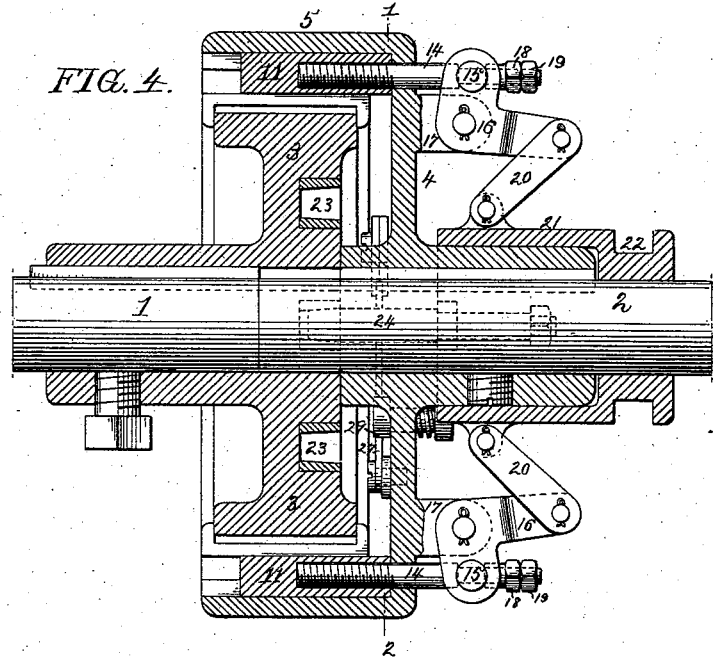
Figure 5:
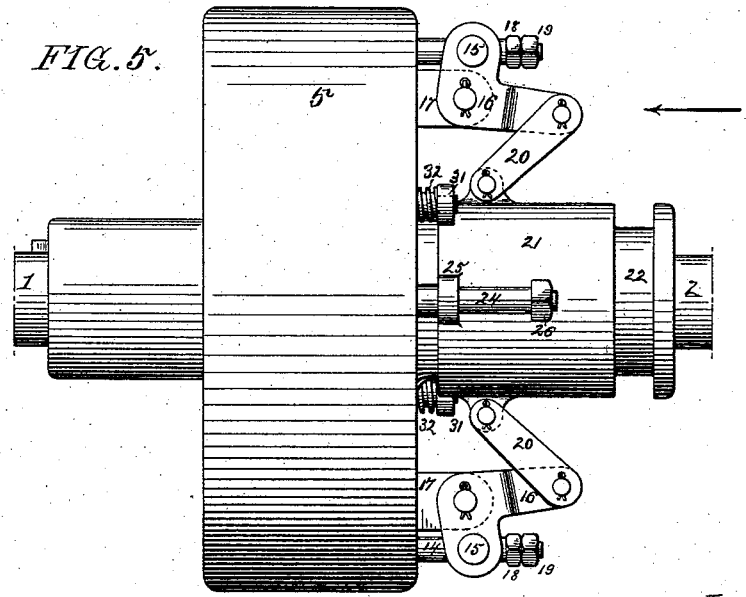
Figure 6:
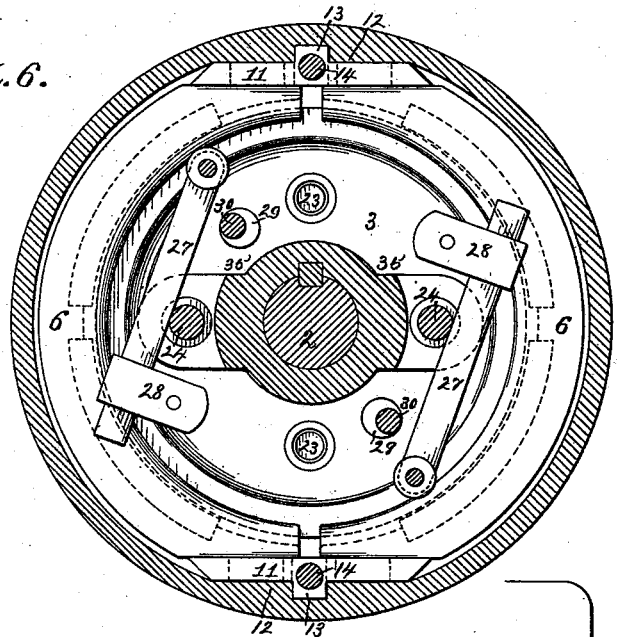
Figure 8:
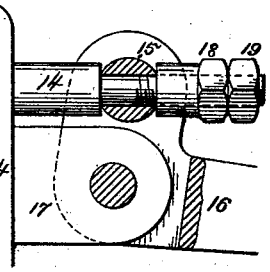
Figure 7:
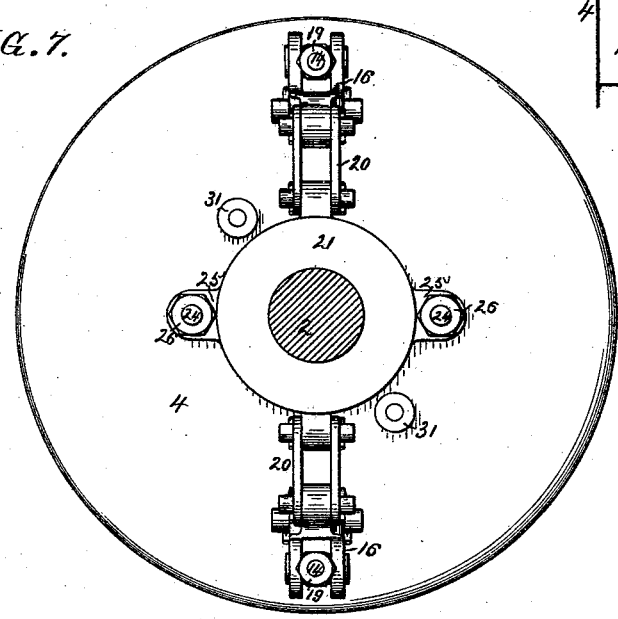

Figure 1, is a perspective view of the various parts of the clutch detached from each other. Fig. 2, is a longitudinal section of the clutch showing the two parts of the same entirely released from driving contact with each other. Fig. 3, is a similar view showing the parts adjusted so as to throw the friction clutch into operation. Fig. 4, is a similar view showing the parts adjusted so as to throw the positive clutch into action and the friction clutch out of action. Fig. 5, is a side view of the clutch. Fig. 6, is a transverse section on the line 1—2, Fig. 4. Fig. 7, is an end view of the clutch looking in the direction of the arrow, Fig. 5. Fig. 8, is an enlarged sectional view of part of the clutch; and Fig. 9, is a sectional plan view on a reduced scale of one of the disks of the clutch.

I have shown my improved clutch as a means of coupling together two shafts 1 and 2, but it will be evident that it may be used for clutching a pulley to a shaft or for any of the purposes for which either positive or friction clutches are usually employed.

In the present instance it may be assumed for purposes of description that the shaft 1 is the constantly running shaft and the shaft 2 is the one which is to be clutched to or released from said constantly running shaft, although the conditions may be reversed without affecting the operation of any part of the clutch.

Upon the shaft 1 is mounted a disk 3 having a long hub keyed and set screwed, or otherwise securely confined to said shaft 1, and similarly mounted upon the shaft 2 is a disk 4 having a projecting flange 5 overlapping the disk 3. A pair of clutching segments 6 is adapted to engage with the periphery of the disk 3, each of these segments having opposite flanges 7 for overlapping the edges of the disk and each segment being also provided with internal friction plugs 8 constituting the bearing surfaces of the segment upon the disk. Each segment also has, at each end, a projecting pin 9 for engagement with an inclined slot 10 in an actuating plate 11 which bears upon a seat 12 formed in the projecting rim 5 of the disk 4, this seat having a central groove for the reception of a rib 13, upon the back of the plate 11, as shown in Fig. 6, so that not only are the operating plates firmly seated against the rim, but they are prevented from moving laterally thereon and are compelled to turn therewith, while at the same time they are free to be moved longitudinally in order to cause the inclined slots 10 to so act upon the pins 9 of the clutch segments 6 as to press said segments firmly into contact with the disk 3 or move them outward so as to be free from contact with said disk.

To each of the plates 11 is adapted a screw bolt 14, the outer end of which is reduced in diameter so as to pass through a pin 15 carried by the forked arm of a bell crank lever 16 which is hung to a bracket 17 on the disk 4, longitudinal movement of the bolt 14 independently of the pin 15 being prevented by the pair of nuts 18 and 19, and the lever 16 being connected by links 20 to a sliding sleeve 21 having a groove 22 for the reception of an operating lever whereby said sleeve can be moved to and fro and can thereby cause the levers 16 to swing on their pivots and thrust the plates 11 forward or draw them backward, according as it is desired to clamp the segments 6 upon the disk 3 or to release said segments therefrom.

In that face of the disk 3 which is adjacent to the disk 4 is formed a series of bushed openings 23, four in the present instance, for the reception of clutch bolts 24 carried by the sliding sleeve 21, each of these clutch bolts being reduced in diameter in order to pass through a lug 25 upon the sleeve and each bolt having at its outer end a nut 26 as shown in Fig. 1, so that while the bolts 24 can be moved by the sleeve 21 there will be a certain amount of lost motion dependent upon the distance between the nut 26 and the shoulder formed by reducing the diameter of the bolt.

The bolts 24 are tapered at the front ends and the recesses 23 are likewise tapered, so that a snug fit of the bolts in the recesses is insured when said bolts are projected, and yet the bolts will enter the recesses readily and can be withdrawn therefrom without excessive friction.

Hung to the inner side of the disk 4 is a pair of arms 27 each of which is provided with an adjustable weight 28, each of these arms being free to swing outward when subjected to centrifugal action on the rotation of the disk 4. These arms 27 are so mounted that when the disk 4 is at rest one or other of the arms will swing inward so as to obstruct the opening in the disk 4 through which one of the clutching bolts 24 passes and will thus prevent the inward movement of the sleeve 21 necessary to cause said bolts to engage with the recesses 23 in the face of the disk 3. The arms 27 can, however, be moved and held out of obstructing position by means of eccentric lifters 29 (Fig. 6) carried by shafts 30 which pass through the disk 4 and have milled heads 31 by which they may be manipulated, springs 32, interposed between these heads and the outer face of the disk, serving as frictional retainers to hold the shafts in any position to which they may have been adjusted.

In order to provide proper bearings for the bolts 24, lugs 35 project laterally from the hub of the disk 4, these lugs having openings for the guidance of the bolts, and being provided with slots 36 (Fig. 9) for the play of the stop arms 27. It will be noticed that the sleeve 21 has a bearing not only upon the hub of the disk 4, but also upon the shaft 2, so that the desired support for both ends of the sleeve is provided, without excessive length of the hub which would otherwise be required, owing to the extended travel of the sleeve.

Having thus described the construction of the clutch, its operation will be readily understood upon reference to Figs. 2, 3 and 4.

When the parts are in the position shown in Fig. 2, the sleeve 21 occupies its extreme outward position, the bolts 24 are withdrawn by contact of the lugs 25 with the nuts 26 so as to permit the stop arms 27 to assume their obstructing position, and the plates 11 are also withdrawn by the action of the lever 16 so that their inclined slots 10, acting upon the pins 9 of the segments 6, force said segments out of contact with the periphery of the disk 3. The first operation in effecting clutching of the shafts together is to move the sleeve 21 to the position shown in Fig. 3, so that the plates 11 will be projected and the clutch segments 6 will be drawn into frictional contact with the disk 3. This position of the sleeve 21 is determined by contact of its lugs 25 with the shoulders of the bolts 24 and the sleeve tends to retain this position owing to the fact that when it is so adjusted the lower ends of the links 20, which connect the sleeve to the levers 16, are directly beneath or slightly in advance of the upper or outer ends of said links, so that the thrust upon the levers 16 cannot have any effect in moving the sleeve 21 outward on the shaft. By the time the friction clutch has become fully operative and the disks 3 and 4 are rotating at the same speed, the arms 27 will, by reason of the centrifugal action, be thrown outward so as to oppose no further resistance to forward movement of the bolts 24, hence on the further forward movement of the sleeve 21, said bolts will be projected and caused to enter two of the recesses 23 in the face of the disk 3, thereby effecting the positive clutching of the two disks 3 and 4 together, as shown by dotted lines in Fig. 4. The same forward movement of the sleeve 21 which effected this result also caused a downward pull upon the levers 16 as likewise shown in said figure, thereby retracting the plates 11 and causing the forcing of the friction segments 6 out of driving contact with the disk 3, this operation taking place just before the pins 24 are in position to enter the openings 23, so that in case said pins are not directly in line with the openings, a slight circumferential movement of one disk in respect to the other will be permitted, until one of the openings 23 is brought into line with each pin 24 which at once enters said opening and positively clutches the two disks together.

It will be evident that in the above described clutch the positive clutching of two elements together is not effected until these elements are rotating at the same, or substantially the same speed, so that this positive clutching is effected without shock or jar of either part, and the clutch is, moreover available for use either as a friction clutch only, or as a positive clutch only, in case either form of clutch becomes disabled.

In releasing the clutch the operation is the reverse of that before described, that is to say, the friction clutch is put into action as the positive clutch is released, and then the friction clutch is released, the sleeve 21 being in effect a quadruple acting sleeve, that is to say, it is double acting both on the forward and backward movement.

Adjustment of the clutching segments to compensate for wear can be readily effected by turning the screw bolts 14 so as to move the operating plates 11 forward to the desired extent and thus bring the clutching segments as closely to the periphery of the disk 3 as desired.

The use of the operating plates 11 with their inclined slots, provides for such an extended movement of the clutching segments, that ample space intervenes between the same and the disk 3, when the said segments are expanded, while the segments are so supported upon the plates and the latter upon the disk 4 that no drop or sag of either segment is possible in any position of the clutch, so that wear or heating of the segments by contact with the rotating disk when the friction clutch is out of use is effectively prevented.

The flange 5 of the disk 4 can, if desired, be used as a pulley for receiving a driving belt or a belt whereby said pulley is caused to drive a pulley on another shaft.

Various modifications in the construction of both the frictional and positive clutching devices can also be made without departing from the essential spirit of my invention as set forth in the claims.

Having thus described my invention, I claim and desire to secure by Letters Patent—

1. The combination in a combined positive and friction clutch, of the friction clutching mechanism, the positive clutch bolts, means for operating said devices, in succession, and centrifugally operated stops whereby the movement of the positive clutch bolts is prevented until the driven element of the clutch attains a certain speed, substantially as specified.

2. The combination in a combined positive and friction clutch, of the frictional clutching mechanism, the positive clutch bolts, means for operating the two clutching devices in succession, centrifugally operated stops for preventing premature projection of the clutching bolts, and means for holding said stops out of operative position, substantially as specified.

3. The combination in a combined positive and friction clutch, of the frictional clutching devices, the positive clutch bolts, means for operating the two clutching devices in succession, centrifugally operated stops for preventing the premature projection of the clutch bolts, cams for holding said stops out of action, and frictional retainers for said cams, substantially as specified.

4. The combination of the two disks, the clutching segments carried by one disk and adapted to engage with the other, the operating plates having a bearing upon the segment carrying disk and provided with inclined slots for the reception of pins on said segments, and means for operating said plates, substantially as specified.

5. The combination of the two disks, the clutching segments carried by one of the disks and engaging with the other, pins on said segments, operating plates each having a bearing upon the disk, a rib guided in a recess in said disk, and inclined slots acting upon the pins of the segments and means for operating said plates, substantially as specified.

6. The combination of the two disks, the clutching segments carried by one of said disks and engaging with the other, the operating plates acting on said segments, the screw bolts engaging with said operating plates, operating levers for said bolts, pins carried by the levers and having openings for the passage of the bolts, and means for confining the bolts longitudinally to said pins, substantially as specified.

7. The combination of the two disks, one of which has a series of tapered openings, frictional clutching devices for said disks, and the clutch bolts carried by one of the disks and having tapered ends adapted to the tapered openings of the other disk, substantially as specified.

8. The combination of the two disks, one having openings therein and the other provided with slotted lugs, frictional clutching devices for said disks, the clutch bolts guided in the lugs, and the centrifugal stop arms playing in the slots of said lugs, substantially as specified.

In testimony whereof I have signed my name to this specification in the presence of two subscribing witnesses.

WM. E. CHALFANT.

Witnesses:
JOSEPH H. KLEIN,
HARRY SMITH.